Patented Mar. 20, 1928.

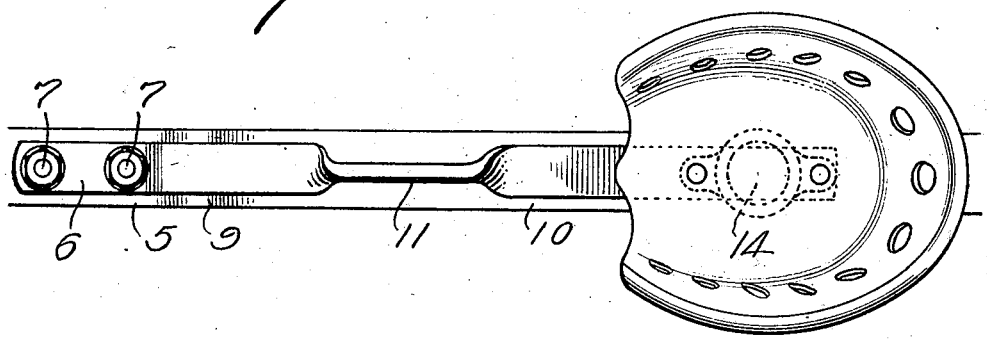
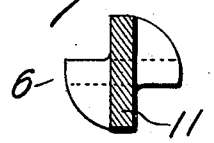
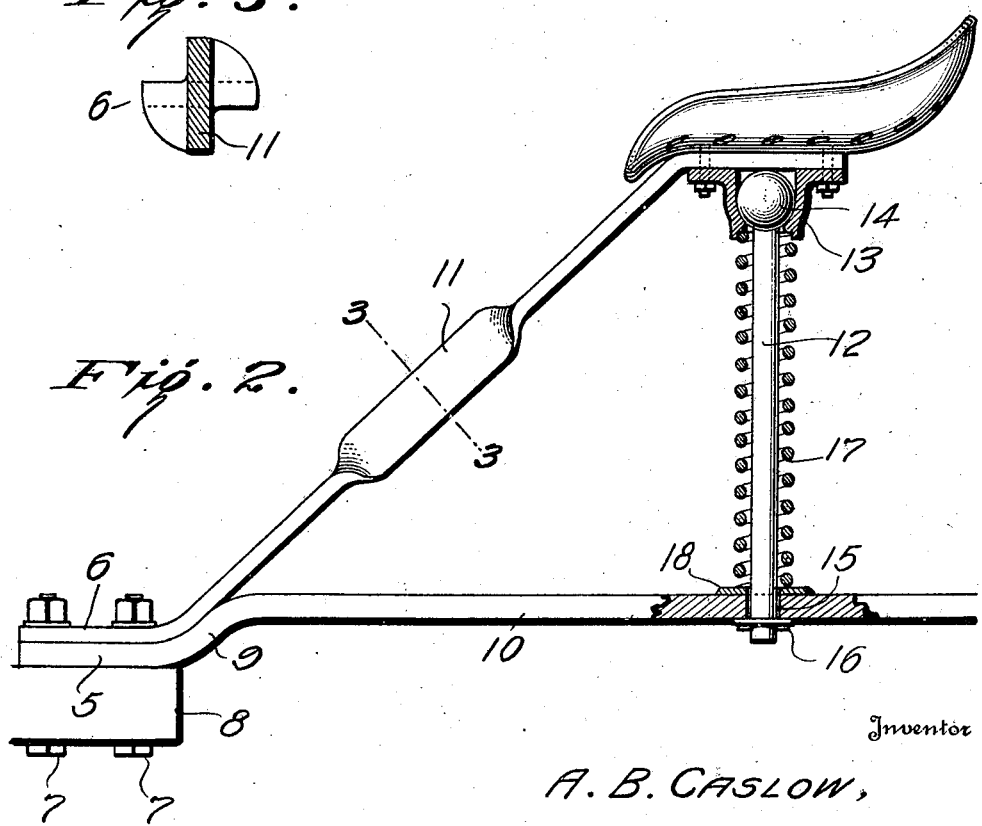

1,663,112

UNITED STATES PATENT OFFICE.

AMOS B. CASLOW, OF ELIZABETHTOWN, PENNSYLVANIA.

TRACTOR SEAT.

Application filed August 17, 1926. Serial No. 129,715.

My invention relates to spring supports for seats of the agricultural machine type and aims to secure ease and comfort for the driver by a novel system of cooperating spring devices which effectively will nullify shocks and other forces solicited by the machine.

The nature of the invention will be clearly apparent from the following detailed description taken in connection with the accompanying drawings, wherein Figure 1 is a plan view of the improved tractor seat support.

Fig. 2 is a side view, partly in section.

Fig. 3 is a section on line 3—3 of Fig. 2.

According to my invention I employ a spring couple, consisting of spring elements 5 and 6, associated with a compensating appliance. The superposed or lapped ends of elements 5 and 6 are rigidly secured, as by bolts 7, to a stationary part 8 of the tractor or other machine. The bottom member 5 is a flat having, beyond its point of anchorage, an upwardly directed bend or offset 9 which is thence continued as a horizontal floating member 10. The offset 9 constitutes an abutment for the top or seat-carrying element 6 and defines the angle of said element with relation to the bottom cushion 10. Evidently the seat-carrying element 6, as usual, is capable of up and down movement under exerted force. It is a merit of the invention, however, that I so construct the element 6 that it is capable also of lateral movement notwithstanding its rigid anchorage. This may be accomplished, for example, by forging or working the flat bar to provide intermediate the flat ends thereof a vertically disposed spring panel 11. Thus in a unitary or integral leaf or plate element spring power is inherently present for both vertical and lateral direction.

In order properly to restrain the duplex action stated and also to secure the benefit of the bottom spring plate or cushion in coordination with the other factors, the system includes a compensating appliance located below the seat and preferably embodied in a spring bolt 12 having at least one universal connection. For this purpose, the seat end of spring element 6 is provided with a cup socket 13 to accommodate a ball element 14 secured to or formed integral with the pin or bolt 12. The other end of the bolt passes through an eye 15 in the bottom cushion 10 and is restrained, for example, by a cotter pin 16. The coiled spring 17 bears at one end upon the socket and at the other end upon a washer or wear plate 18. The ball and socket connection is meritorious in that it admits of general flexure or spring action under the proper restraint necessary to ease and comfort.

Having described my invention, I claim:—

1. A support for seats of the nature indicated comprising top and bottom spring bars having a common anchorage and angularly disposed floated portions, the bottom bar having an offset constituting an abutment for defining the angle between the bars, the top bar having horizontally disposed flat ends and having a vertically disposed spring panel between its flat ends, a spring interposed between the free ends of the top and bottom bars, and a pin connected at one end to one of the bars for universal movement and at the other end to the other of the bars for sliding movement through it, substantially as described.

2. A support for seats of the nature indicated comprising top and bottom spring bars having a common anchorage and angularly disposed floated portions, the top bar having horizontally disposed flat ends and having a vertically disposed spring panel between its flat ends, a spring interposed between the free ends of the top and bottom bars, and a pin connected at one end to one of the bars for universal movement and at the other end to the other of the bars for sliding movement through it.

In testimony whereof I affix my signature.

AMOS B. CASLOW.